Figure 1:
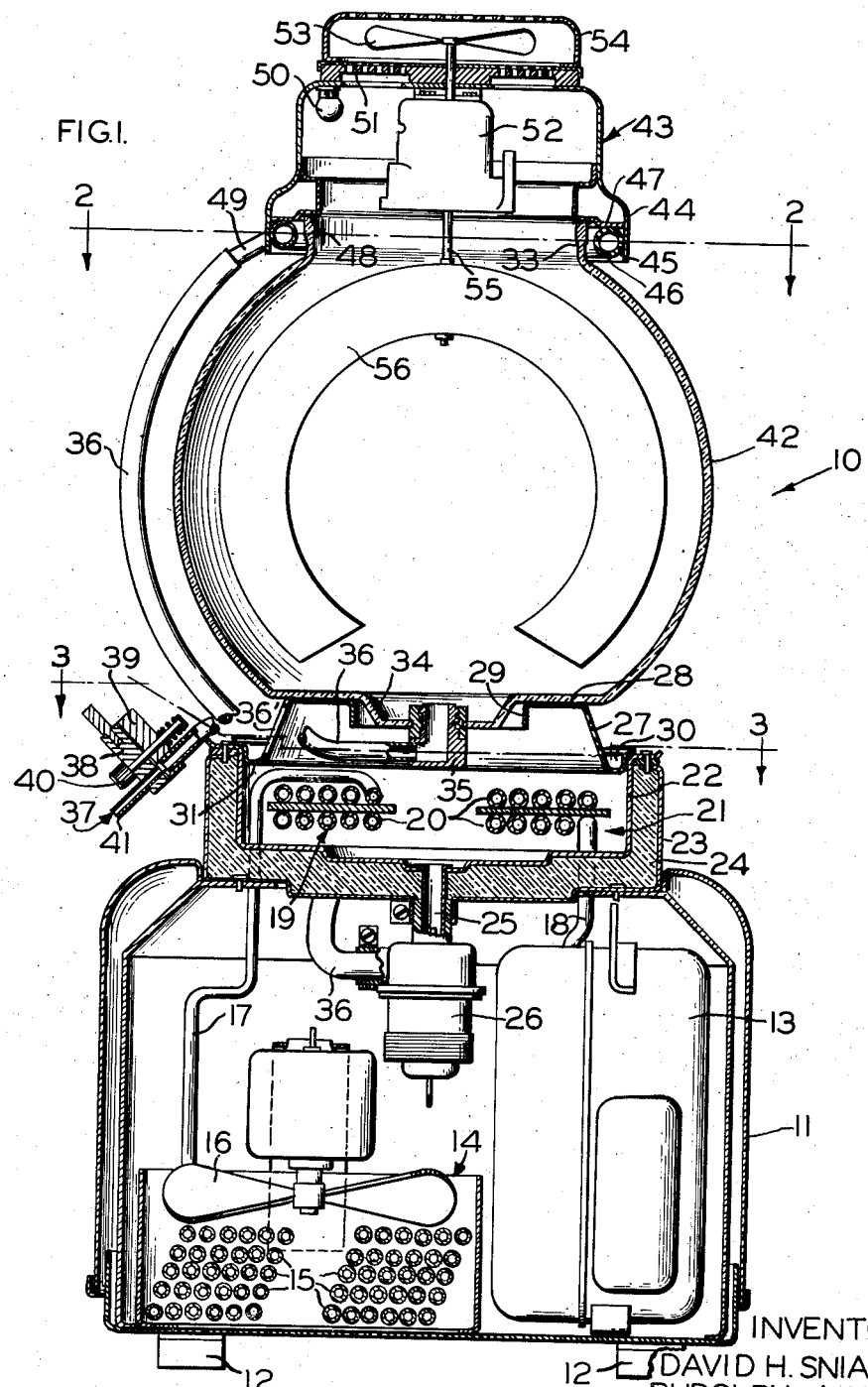

July 27, 1954    D. H. SNIADER ET AL    2,684,580
BEVERAGE COOLING AND DISPENSING DEVICE Filed March 19, 1952    3 Sheets-Sheet 2

INVENTORS
DAVID H. SNIADER
RUDOLPH A. YUZA
BY Hilmond O. Vogil
ATT'Y

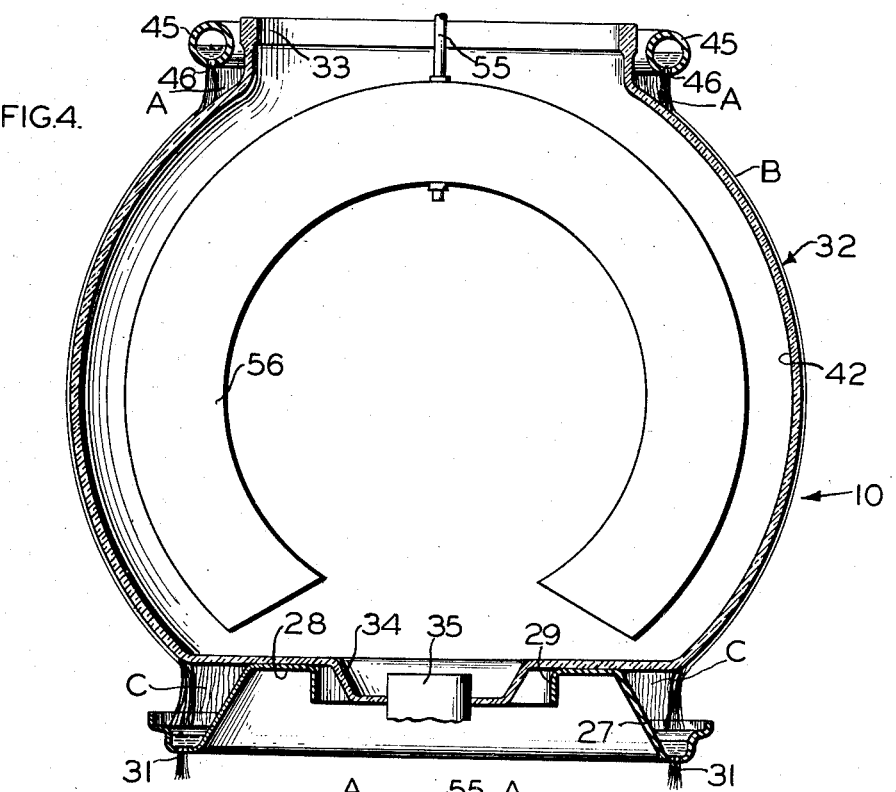
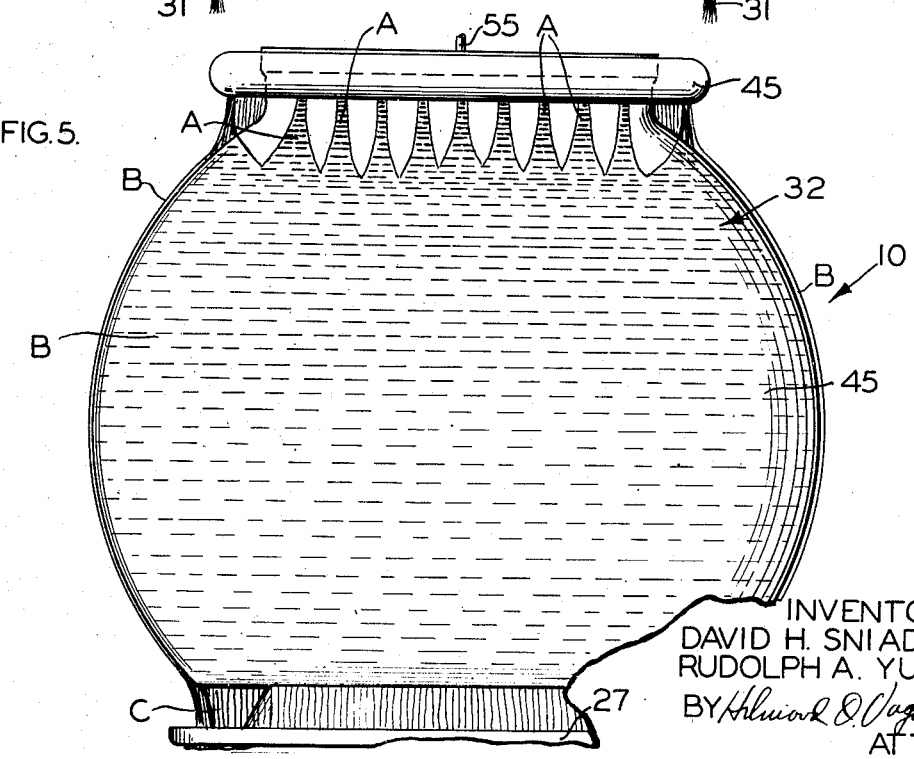

Patented July 27, 1954

2,684,580

UNITED STATES PATENT OFFICE 2,684,580

BEVERAGE COOLING AND DISPENSING DEVICE

David H. Sniader and Rudolph A. Yuza, Chicago, Ill.

Application March 19, 1952, Serial No. 277,452

5 Claims. (Cl. 62—141)

This invention relates to an improvement in beverage cooling and dispensing devices and more specifically it relates to the type of beverage cooler which is particularly adaptable for dispensing concentrate type of beverages.

It is a prime object of this invention to provide an improved beverage dispensing and cooling device having a refrigerating unit including a dispensing coil adapted to direct a stream of liquid against the outer smooth surface of a spherical beverage container in a manner wherein the cooling liquid and its refrigerating means is completely separate and independent of the container which contains the beverage.

Another object of this invention is to provide a beverage cooler and dispenser having a spherically shaped beverage container of transparent material, the beverage container having a smooth outer surface against which a plurality of streams of cooling liquid are directed thereby cooling the beverage within the beverage container by forming on the outer surface of the beverage container a thin sheet of liquid which envelops the beverage container in heat exchange relation.

Still another object is to provide an improved beverage dispensing and cooling device including a refrigerating mechanism for cooling the liquid contained within a liquid reservoir, the dispenser including a beverage container of thin transparent material shaped in the form of a bowl or sphere, the refrigerant mechanism including a coolant dispensing coil which is adapted to direct a substantially continuous sheet of coolant liquid against the outer smooth surface of the beverage container, the sheet of liquid being very thin and adhering to and enveloping the outer spherical surface of the container under surface tension whereupon a high and efficient rate of heat transfer is effected with respect to a beverage contained within the beverage container.

A still further and unique object of the invention is to provide a beverage cooler including a transparent bowl which contains the beverages, the bowl having provisions whereby a coolant liquid is directed against the outer smooth surface of the bowl thereby forming a sheet of liquid which completely envelops the bowl to effect a high rate of heat transfer, the bowl having an impeller contained therein, the impeller being operable for sweeping the beverage contained within the bowl against the inner surface of the bowl thereby promoting effective heat transfer, the arrangement also being extremely attractive in appearance and sanitary since the coolant which effects the cooling of the beverage is kept completely separate of the beverage within the container.

Still another object of this invention is to provide an improved beverage cooling and dispensing device including a housing having a compressor and a condenser disposed therein, the housing including a coolant reservoir having cooling coils therein adapted to cool liquid which is removed from the reservoir by means of a pump, the liquid being directed upwardly to an annular dispensing conduit which is supported at the upper end of a beverage container, the beverage container comprising a spherical bowl of transparent material having a smooth outer edge, the dispensing coil being arranged to direct a sheet of liquid against the upper surface of the bowl or container, this sheet of liquid being sufficiently thin to adhere to the outer smooth surface of the bowl by surface tension, the unit further including a collector ring which is disposed immediately beneath the bowl for collecting the liquid which is discharged from the outer surface of the bowl.

These and further objects will become more readily apparent from a reading of the specification when examined in connection with the accompanying sheets of drawings.

Figure 2:
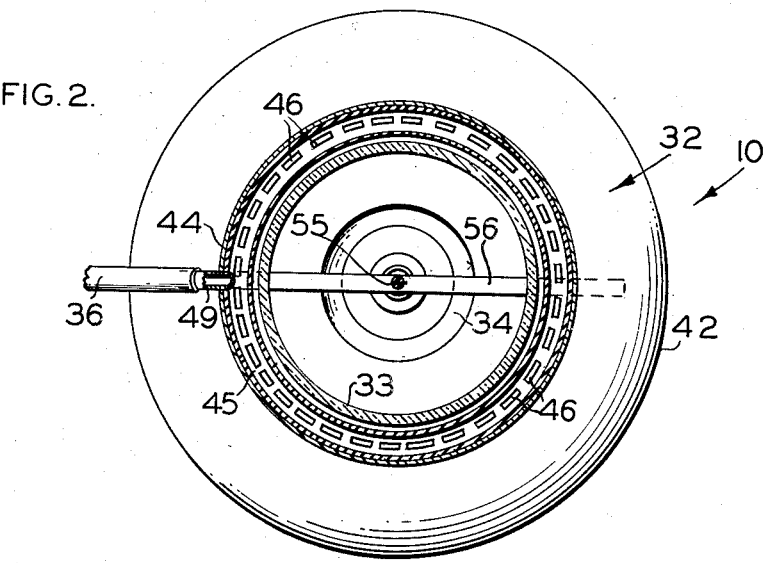
Figure 3:
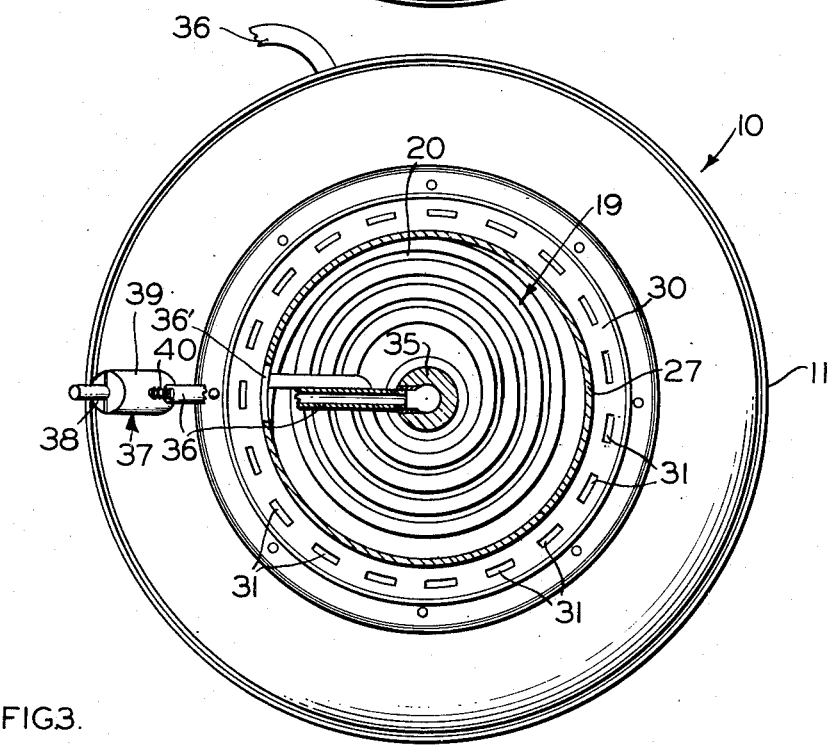

In the drawings:

Figure 1 is a sectional view through a beverage cooling and dispensing device embodying the features of the invention, Figure 2 is a sectional view of the cooling and dispensing device taken along the line 2—2 of Figure 1, Figure 3 is a sectional view taken along the line 3—3 of Figure 1, Figure 4 is a sectional view through a bowl or beverage container showing the operative condition when a stream of liquid is directed against the smooth outer surface of the beverage container, and Figure 5 is a side elevational view of a bowl containing a beverage to be dispensed, the bowl being shown in an operative condition when a coolant is directed against the outer smooth surface of the bowl to form a continuous sheet of cooling liquid which is in heat exchange relation with respect to the bowl.

Referring now particularly to Figure 1 a beverage cooling and dispensing device is generally designated by the reference character 10. The beverage cooling and dispensing device 10 comprises a sheet metal housing 11 which is suitably supported on base members 12. A compressor unit 13 is positioned within the housing 11 and a condensing unit 14 is positioned adjacent to the compressor 13. The compressor unit 13 and condensing unit 14 may be of a conventional type, the condensing unit 14 including a plurality of coils 15 which are positioned adjacent to a motor driven fan 16. The condenser 14 and compressor unit 13 are suitably connected by means of conduits or connections 17 and 18 to a heat exchanger generally indicated by the reference character 19. The heat exchanger 19 comprises a plurality of refrigerant coils 20 which are positioned within a liquid reservoir 21. The liquid reservoir 21 is formed of an annular sheet metal pan 22 which is suitably supported on the sheet metal housing 11 by means of an annular support 23. Suitable insulating material as indicated at 24 is positioned in the space provided by the annular support 23 and the metal pan 22.

A liquid connection 25 is in communication with the reservoir 21 and a pump 26 positioned below the said reservoir 21. A collector ring 27 forms a cover for the reservoir 21, the collector ring 27 having at its upper end an annular supporting surface 28. The collector ring is also provided with a centrally disposed opening 29. The lower edge of the collector ring 27 is provided with an upwardly turned flange providing an annular trough 30. The annular trough 30 includes a plurality of circumferentially extending openings 31 best shown in Figures 1 and 3, these openings 31 being in communication directly with the liquid reservoir 21.

A beverage container generally designated at 32 is supported on the collector ring 27. The beverage container 32 is open at its top as indicated by the reference character 33 in Figures 1, 3 and 4. The beverage container 32 at its lower end is provided with an annular projecting portion 34 which projects downwardly into the opening 29 as indicated in Figure 1. An outlet fitting 35 is suitably connected to the annularly projecting portion of the beverage container 32, the outlet fitting 35 being suitably connected to a conduit 36. A dispensing valve 37 may be of conventional construction the valve including a pair of plate members 38 and 39 which are resiliently held together by means of a pivotal tension element 40. The conduit 36 is connected, as indicated in Figure 1, to the plate member 39. A nozzle 41 is connected to the plate member 38, the nozzle 41 being movable with the plate member 38 into cooperative registry or alignment with the conduit 36 for dispensing liquid from the beverage container 32.

As best shown in Figures 4 and 5 the beverage container 32 is provided with a spherical wall of thin transparent material 42. The container 32 can be said as being "bowl" shaped. The material used for the container may be glass or may be of some suitable synthetic plastic. The outer surface, as indicated in the figures of the bowl shaped container 32, is completely smooth, this feature being of prime importance in the operation which will be described later.

As best shown in Figure 1 the dispensing unit 10 is provided with a cover structure 43 which is seated on top of the container 32. The cover structure 43 includes a sheet metal skirt 44 which suitably supports an annular cooling liquid discharge coil 45. The cooling coil 45 is disposed to encircle the upper end of the bowl or container 32. The coil 45 is provided with a plurality of openings 46 which are adapted to direct liquid in streams against the upper outside surface of the beverage container 32. The openings 46 are circumferentially spaced but of course these openings need not be individual openings since the coil may include a slot which is substantially continuous for effecting a similar discharge of cooling liquid. The cooling liquid discharge coil 45 is supported by an annular plate 47, which as indicated at 48, seats against the upper annular edge of the bowl 32. The liquid discharge coil 45 includes a connection 49 which is suitably connected to the conduit 36 which is in communication with the pump 26.

A light bulb 50 is suitably mounted in the cover structure 43. A perforated plate 51 is positioned above the bulb 50. The perforated plate 51 suitably supports a power unit 52 which is adapted to rotate an air fan 53. A perforated cover plate 54 encloses the fan 53, the fan 53 obviously being utilized for exhausting warm air from the cover structure 43 for cooling the portion of the cover structure which contains the bulb 50. A shaft 55 projects downwardly from the power unit 52. The shaft 55 in turn is connected to an impeller or agitator which is disposed within the beverage container 32. The impeller or agitator 56 is of a U-shaped structure so that the beverage within the container may be efficiently swept against the inner wall of the beverage container.

In operation, the liquid within the reservoir, in this case the liquid being water, is suitably cooled in a conventional manner by means of the heat exchanger 19. The beverage container 32 contains the beverage which is to be dispensed. The pump 26 under pressure directs the cooled liquid through the conduit 36 to the discharge coil 45. The coolant under pressure as best shown in Figures 4 and 5 is discharged through the openings 46 against the upper surface of the spherical wall 42. The spherical wall 42 of the container 32 is very smooth and the liquid is discharged to form a thin film or sheet B, which being sufficiently thin adheres to the outer surface of the spherical wall 42 as shown by means of surface tension so that the film B completely envelops and conforms to the outer surface contour of the wall 42. The discharge streams from the discharge conduit 45 are indicated by the letter A. It must be understood of course that the discharge streams A need not emanate from circumferentially disposed openings 46 but that the openings 46 may be continuous with respect to the coil 45. The thin sheet or film of coolant B is especially effective to exert a high rate of heat transfer with respect to the beverage contained within the container 32. By means of surface tension the complete bowl or container 32 is enveloped with this thin highly effective film of coolant. As the coolant film B reaches the lower edge of the container 32 or spherical wall 42 it breaks loose from its surface adhesion or tension and as indicated at C is discharged to the collector ring 27, which is disposed immediately below and adjacent the minimum external periphery of the spherical wall, and specifically to the trough 30 whereupon it is discharged through the openings 31 back to the liquid reservoir 21. In order to increase the efficiency of the heat transfer or cooling action of the film B the impeller 56 is continuously rotated within the container 32. The impeller 56 continually sweeps portions of the concentrate beverage within the container 32 against the inner surface of said container. This continual agitation combined with the film B is effective to secure a very high efficiency of heat transfer in so far as cooling of the beverage is concerned.

By virtue of the relatively thin film of liquid on the outer surface of the spherical bowl the beverage within the container 32 is efficiently cooled by the utilization of minimum amounts of cooling liquid. Thus a high efficiency is obtained with a minimum of refrigerating energy and power. It is also important to note that the bowl is completely and fully enveloped by the sheet B thus effectively cooling the concentrate within the container 32.

The structure disclosed above is extremely sanitary since the cooling action is completely apart and independent of the concentrate or beverage contained within the container. Any possibility of contamination which might occur in the conventional type of beverage cooler due to a breakdown in the refrigeration system is prevented by the novel construction disclosed. The light bulb 50 also lights up the interior of the beverage container 32 and the film of liquid B combined with the transparency of the bowl or container 32 makes up for a very attractive unit the attractiveness also being greatly enhanced by the movement of the concentrate within the container as effected by the impeller 56.

It can now be seen that an efficient and entirely novel dispensing and cooling device has been presented. The objects of the invention have been fully achieved and it must be understood that changes and modifications may be made which do not depart from the spirit of the invention as disclosed nor the scope thereof as defined in the appended claims.

What is claimed is:

1. A beverage dispenser comprising a housing, a liquid reservoir within said housing, a heat exchanger in heat exchange relation with said reservoir for cooling liquids therein, a beverage container supported on said housing, said container having a spherical relatively thin transparent glass side wall, with a smooth uninterrupted outer surface, a dispensing conduit in communication with said container, means for directing a cooling liquid directly against an annular upper outside surface of said side wall, said means including an annular discharge conduit supported by said container adjacent the upper end thereof, said annular conduit having a substantially continuous discharge opening, a pump having a first fluid connection in communication with the liquid reservoir, a second fluid connection providing for communication with said pump and said annular discharge conduit whereupon a substantially continuous annular stream of cooling liquid under pressure is directed against the outer surface of said spherical wall whereby a relatively thin uninterrupted sheet of cooling liquid envelops said spherical wall and adheres thereto in heat exchange relation and under surface tension, and is discharged therefrom adjacent the lower edge of said spherical wall, a collector ring disposed below and immediately adjacent the minimum external periphery of said spherical wall for collecting the cooling liquid, a return conduit in communication with said collector ring and said reservoir for returning the cooling liquid thereto, and agitating means within said beverage container for agitating liquid into surface contact with the inner surface of said spherical wall.

2. A beverage dispenser comprising a housing, a liquid reservoir within said housing, a heat exchanger in heat exchange relation with said reservoir for cooling liquids therein, a beverage container supported on said housing, said container having a spherical relatively thin side wall, with a smooth uninterrupted outer surface, a dispensing conduit in communication with said container, means for directing a cooling liquid directly against an annular upper outside surface of said side wall, said means including an annular discharge conduit supported by said container adjacent the upper end thereof, said annular conduit having a substantially continuous discharge opening, a pump having a first fluid connection in communication with the liquid reservoir, a second fluid connection providing for communication with said pump and said annular discharge conduit whereupon a substantially continuous uninterrupted annular stream of cooling liquid under pressure is directed against the outer surface of said spherical wall whereby a relatively thin sheet of cooling liquid envelops said spherical wall and adheres thereto in heat exchange relation and under surface tension, and is discharged therefrom adjacent the lower edge of said spherical wall, a collector ring disposed below said spherical wall for collecting the cooling liquid, a return conduit in communication with said collector ring and said reservoir for returning the cooling liquid thereto, an impeller within said beverage container, means for supporting said impeller for rotating movement about a vertical axis, and means for rotating said impeller to continually sweep the beverage within the container into contact with the inner surface of said spherical wall.

3. A beverage dispenser comprising a housing, a liquid reservoir within said housing, a cooling coil within said reservoir, a compressor and a condenser connected to said cooling coils, a beverage container supported on said housing, said container having a relatively thin spherical wall, with a smooth uninterrupted outer surface, and being open at its upper end, a dispensing conduit in communication with said beverage container, means for directing a cooling liquid against an annular upper outside surface of said spherical wall, said means including a cover supported over the open end of said container, an annular conduit supported on said cover, said conduit having a plurality of circumferentially disposed liquid discharge openings, a pump having a first fluid connection in communication with said liquid reservoir, and second fluid connection in communication with said pump and said annular conduit for delivering cooling liquid under pressure thereto, thereby directing a plurality of streams of cooling liquid against the spherical wall, whereby a relatively thin uninterrupted solid sheet of cooling liquid envelops the outer surface of said spherical wall and adheres thereto in heat exchange relation and under surface tension, and is discharged therefrom adjacent the lower edge of said spherical wall.

4. A beverage dispenser in accordance with claim 3, said dispenser including a collector ring disposed below the lower edge of said spherical wall for collecting the cooling liquid and including means for returning said cooling liquid to said liquid reservoir.

5. A beverage dispenser in accordance with claim 4, said dispenser including a power unit supported on said cover, and an agitator supported from said power unit for rotation about a vertical axis, said agitator being contained within the beverage container and being arranged to continually sweep the beverage into contact with the inner surface of said spherical wall.

References Cited in the file of this patent

UNITED STATES PATENTS

| Number | Name | Date |
| --- | --- | --- |
| 1,336,172 | Tripp | Apr. 6, 1920 |
| 1,726,093 | Williams | Aug. 27, 1929 |
| 2,140,744 | Hirsch | Dec. 20, 1938 |
| 2,211,527 | Straub | Aug. 13, 1940 |
| 2,513,610 | Williams | July 4, 1950 |